Patented May 22, 1951

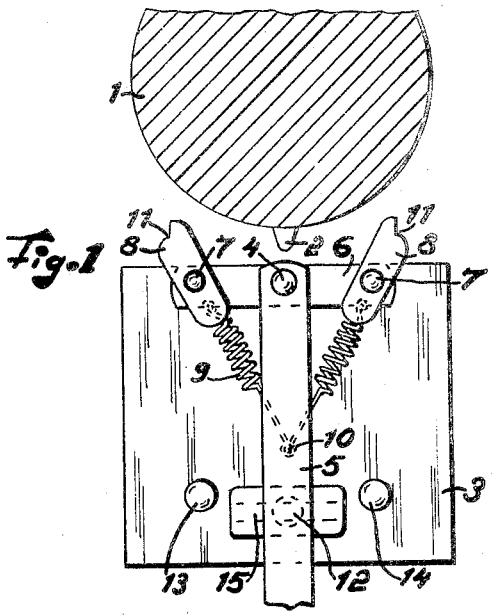
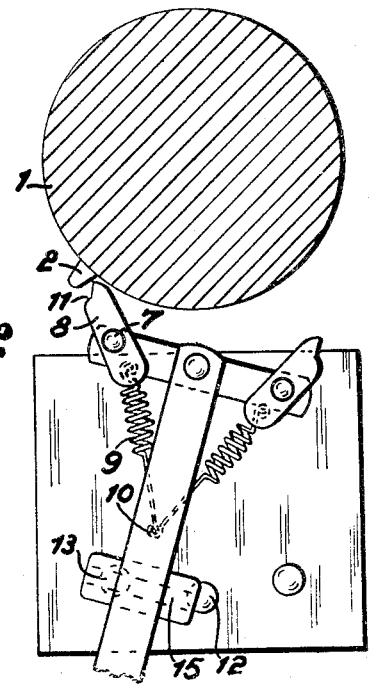

2,554,057

UNITED STATES PATENT OFFICE 2,554,057

DIRECTION SIGNAL CONTROL MECHANISM

Adolf Helmer Pettersen, Goteborg, Sweden

Application July 29, 1947, Serial No. 764,489
In Sweden August 5, 1946

2 Claims. (Cl. 74—484)

The invention relates to direction indicators for vehicles of the type in which the indicator proper (for example a luminous arrow) or indicators proper are brought to the direction-indicating position in response to a movable operating member and are restored from this position dependent upon the movement of the steering member (for example the steering wheel of a motor car) of the vehicle when said member returns after a change of the course of travel. Prior devices with such automatic restoration of the operating member have shown a lot of drawbacks, among other things it has proved to be impossible to effect the operating movement needed for the actuation of the indicators by the operating member in certain positions of the steering member of the vehicle. These positions are located within a relatively large angle of one complete turn of the steering member. In addition to the presence of the dead angle within which the operating movement has consequently been impossible, it has been required, in certain cases, too large a movement of the steering member in restoring the operating member. Other drawbacks have been too many springs and complicated details with rather heavy and often occurring defects, and further the adjustment of the engagement has been primitive and unreliable.

The object of the invention is to provide a simple and reliable structure of the device by which the direction indicator receives an impulse for shifting to the direction-indicating position and by which the automatic restoration of this device is effected. The essential characteristic of the invention is, in the first place, that pawls pivoted to the operating member and actuated by a carrier movable together with said steering member for the restoration of the operating member and of the indicator are each swingable in both directions from an intermediate position.

Generally an electric transmission is employed between the operating member and the indicators proper, the operating movement in the impulse-giving is associated with the engagement of a contact which closes a circuit in which the indicator is included, but the invention is not limited to this application but may also occur in other for example purely mechanical transmission of the operating movement.

Further features of the invention will be apparent from the following detailed description, reference being had to the accompanying drawing in which Fig. 1 is a plan view at right angles to the steering shaft of the hand wheel, illustrating the device in an intermediate position and Fig. 2 is a similar view with the device engaged in one direction.

In the drawing 1 denotes a member movable together with the steering member of the vehicle such as for example a steering wheel shaft or a steering wheel head, and this member is provided with a carrier in the form of a projection 2. Pivoted to a stationary plate 3 by a pin 4 is an operating member comprising an operating lever 5 and an arm 6 fixed thereto, the latter arm carrying a pawl 8 at each side of the pin 4 and pivoted to the arm by a pin 7. One end of each pawl is connected with a pin 10 on the operating lever 5 by a pulling spring 9, whereby it is kept directed obliquely outwards whereas the other end is formed with an abutment surface 11 for cooperation with the projection 2.

In case of electric transmission of the impulse to the indicators the operating device is combined with contact means illustrated in the drawing by a stationary central contact 12, two stationary lateral contacts 13, 14 and a movable contact piece 15. The stationary contacts are mounted on the plate 3, whereas the contact piece 15 is secured to the operating lever 5 and has such an extension that it is able to bridge the gap between the contacts 12, 13 or 12, 14 as the operating lever is swung to the left or the right in the drawing.

If the device is mounted on the steering wheel column of a motor car so as to project to the left relatively to the steering wheel shaft its operation can be described as follows:

In driving the car straight forward the projection 2 is located in the prolongation of the centre line of the operating lever 5 as shown in Fig. 1. If the course of travel is to be changed to the right, the operating lever 5 is moved forward (to the left in the drawing) through a certain angle such as for example 15°, so that one (in the drawing the left one) pawl 11 will become sliding at the steering wheel shaft 1 as shown in Fig. 2. When the steering wheel is then turned to the right, the projection 2 secured to the steering wheel shaft 1 slides past said pawl 11 which is then still maintained in engagement with the steering wheel shaft due to the spring 9. In returning the steering wheel to a position for driving straight forward, the projection 2 catches said pawl 11 and carries it along so that the operating lever and the pawl are swung back to their initial position. The corresponding course takes place if the operating lever is returned (to the right in the drawings) in turning the vehicle to the left.

Suitable and possibly resilient friction means may be provided to cause the operating lever to remain in position after being turned to this position until it is restored by the projection. In case of electric transmission this friction means may be combined with the contact device for coupling of the indicators, and the contact piece 15 may comprise a leaf spring of suitable form and the contacts 12, 13, 14 may be mounted in recesses into which the ends of the leaf springs slide when the operating lever is moved outwards. The device may then comprise a circuit, which is closed by one indicator as the latter is moved to a direction-indicating position in bridging the contacts 12, 13, and a circuit which is closed by the second indicator in bridging the contacts 12, 14.

The pawls 11 are free to turn about the pins 7 in both directions from the intermediate position in which they are maintained by the spring 9, and as a result the pawls do not prevent the operating lever from being turned outwards and the contact device from being engaged in any position of the projection 2.

The invention is not limited to the illustrated embodiment which is only intended to elucidate the principle of the invention.

What I claim is:

1. In combination with a movable vehicle steering member, a direction signal control mechanism comprising a supporting means, a movable operating member on said supporting means for giving signal impulses, a carrier secured to the steering member, pawls pivoted to the movable operating member to be actuated by said carrier, and means to keep the pawls resiliently in an intermediate position, said latter means as well as the operating member being adapted to permit swinging of the pawls in both directions from such intermediate position.

2. In combination with a vehicle steering wheel element, a direction signal control mechanism comprising a supporting plate, an operating member pivoted to the supporting plate, a carrier secured to the steering wheel element, pawls pivoted to the operating member at each side of the pivot point of said member on the supporting plate and each having an abutment surface for cooperation with the carrier, and a spring connected with each pawl and the operating member to keep each pawl in an intermediate position relatively to the operating member and to allow swinging of the pawl in both directions from said intermediate position, the abutment surface, of either pawl being located in the path of travel of said carrier after swinging the operating member outwardly to bring said pawl in slidable engagement with the steering wheel element.

ADOLF HELMER PETTERSON.

REFERENCES CITED

The following references are of record in the file of this patent:

UNITED STATES PATENTS

| Number | Name | Date |
|--------|------|------|
| 1,199,384 | Hutchinson | Sept. 26, 1916 |
| 1,450,930 | Walter | Apr. 10, 1923 |
| 1,840,078 | Bergh et al. | Jan. 5, 1932 |
| 2,045,045 | Moore | June 23, 1936 |